Patented Mar. 15, 1932

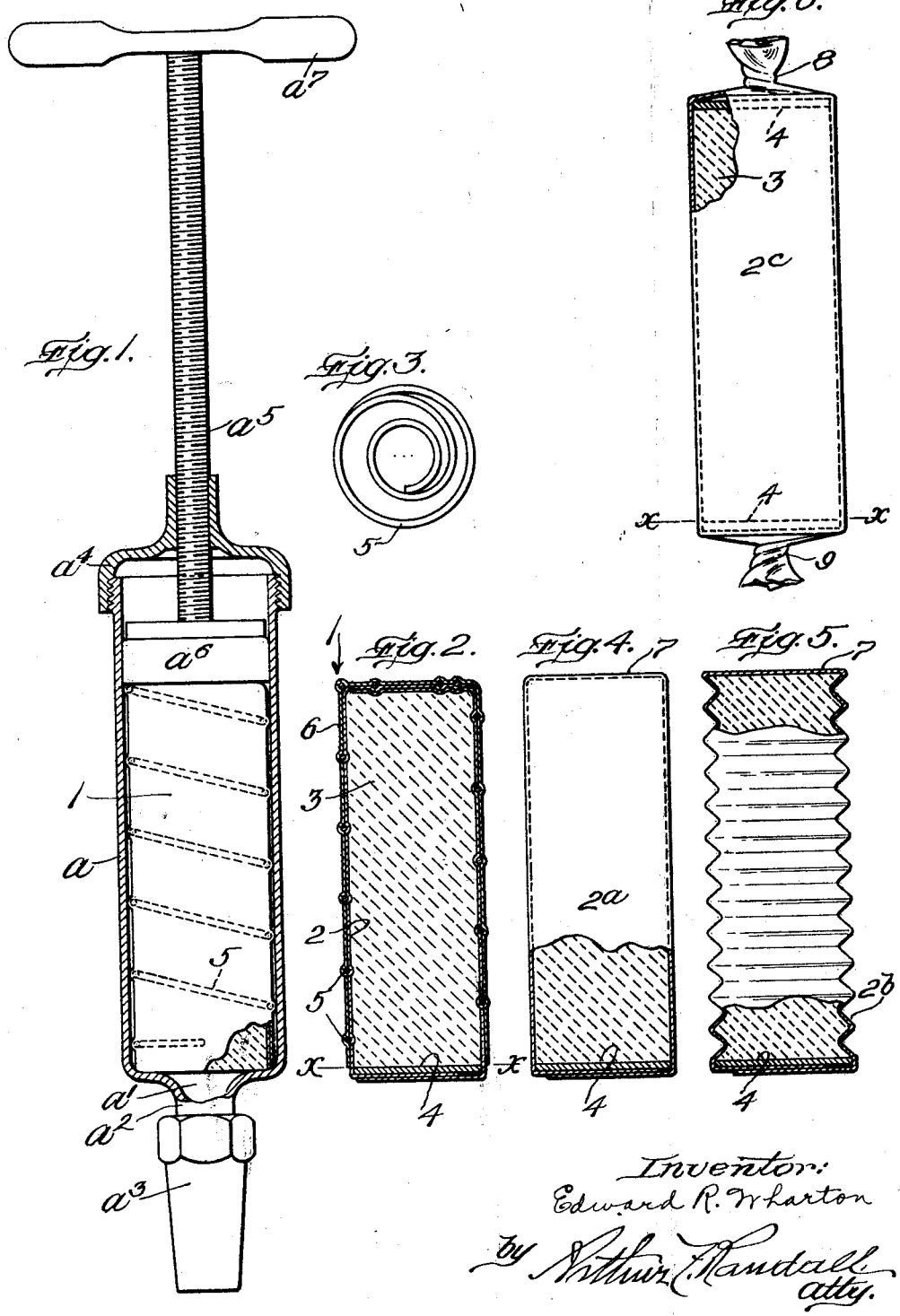
March 15, 1932. E. R. WHARTON 1,849,391
GREASE CARTRIDGE AND THE LIKE
Filed March 11, 1930

1,849,391

UNITED STATES PATENT OFFICE

EDWARD R. WHARTON, OF MEDFORD, MASSACHUSETTS, ASSIGNOR OF ONE-HALF TO FREDERICK M. DURKEE, OF BROOKLINE, MASSACHUSETTS

GREASE CARTRIDGE AND THE LIKE

Application filed March 11, 1930. Serial No. 434,961.

My invention relates to a new article of manufacture consisting of a cartridge-like package of grease, paste or similar material, for use in connection with an instrument such as a "gun" that is employed for distributing or dispensing the same, and it has for its object to provide a new article of manufacture of this kind or class by means of which a grease gun or the like may be quickly and conveniently loaded.

Heretofore grease guns have been so constructed that considerable time and labor was required in loading the same and this operation of loading was comparatively difficult and tedious, as well as disagreeable, owing to the character of the material being handled.

My invention provides, as a new article of manufacture and commerce, a cartridge for a grease gun or the like, said cartridge consisting of a flexible imperforate collapsible envelope of thin sheet material completely inclosing and housing a body of grease, paste or the like, which is preferably made of a length that is greater than its cross-sectional dimensions.

Other features of my invention are hereinafter pointed out.

In the accompanying drawings:

Figure 1 is a view, partly in elevation and partly in longitudinal section, of a grease gun containing a cartridge constructed in accordance with my invention.

Figure 2 is a central longitudinal sectional view of the cartridge shown in Figure 1 illustrating the construction of the same before it is prepared for insertion within the grease gun.

Figure 3 is a view of the coiled spring hereinafter described.

Figure 4 is a side elevation, partly in section, of another form of my invention.

Figure 5 is a side elevation of a third form of my invention.

Figure 6 illustrates another form in which the invention may be embodied.

The type of grease gun illustrated in Fig. 1 of the drawings is in common use at the present time and comprises a cylinder $a$ having a constricted outlet $a'$ at its lower end extending through an exteriorly threaded nipple $a^2$ on to which is screwed a valved delivery nozzle $a^3$. At its upper end the cylinder $a$ is exteriorly threaded to receive upon it an internally threaded cap $a^4$ provided at its middle with a threaded aperture that is engaged with the threaded stem $a^5$ of a piston $a^6$. Usually this piston $a^6$ includes a leather cup confined between washers rotatably connected with the inner end of the stem $a^5$. At its upper end the stem $a^5$ is provided with a handle $a^7$.

Heretofore the cylinder $a$ has been loaded by forcing grease into the same by means of the hands or by means of a trowel, or wide bladed knife, and difficulty has always been experienced in loading the same because of air that would be trapped within the cylinder with the grease. Furthermore the operation of loading was a messy one and it was practically impossible to carry out the operation without soiling the exterior of the gun and the hands, which made it a difficult matter to reassemble the gun after filling the same owing to the slippery condition of the parts thereof.

My invention provides a cartridge indicated generally at 1, Fig. 2, consisting of a collapsible wrapper or envelope 2 of imperforate thin flexible sheet material completely inclosing and housing a body 3 of grease. This envelope 2 may conveniently be made from tin foil or the like, and is of tubular form so that the length of the cartridge is considerably greater than the cross-sectional measurements thereof. Preferably the cartridge 1 is circular in cross-section and is of an outside diameter to fit loosely within the cylinder $a$ of the grease gun.

The tubular envelope 2 is closed at its opposite ends by folding inwardly the end portions thereof as shown in the drawings and securing said end portions in their folded-in positions by cement or otherwise.

In some forms of my invention a disc 4 of pasteboard or other stiff material is assembled within the package at one end thereof as shown.

The tubular envelope 2 is disposed within a metallic spiral spring 5 whose upper end portion is brought inwardly as shown in Fig. 3 so as to rest against the top end portion of the envelope 2. This spring 5 may be secured in position upon the envelope 2, and held against displacement thereon, by means of an outer wrapping 6 of thin flexible sheet material. In Fig. 2 this wrapping is also of tubular form but it is provided with a single end wall only that is at the top of the package.

When the grease gun of Fig. 1 is to be loaded the cylinder $a$ is unscrewed from the cap $a^4$ and withdrawn from the piston $a^6$. Then the lower end wall of the package is removed by cutting it away from the body portion of the envelope 2 on the plane $x$—$x$. This may conveniently be effected by means of a pen knife, and it will be clear that the purpose of the disc 4 is to support the side wall of the envelope 2 while it is being thus cut. The package is then slid endwise into the cylinder $a$, with this open end lowermost, after which the piston $a^6$ is inserted within the cylinder $a$ and the cap $a^4$ screwed on to the upper end of the latter.

It will be clear that after the cylinder $a$ has been thus loaded the contents of the package can be ejected from the gun by screwing the stem $a^5$ inwardly. During this inward movement of the stem $a^5$ and piston $a^6$ the spring 5 is compressed so that when the contents of the gun is exhausted and the piston is again removed from the cylinder, the spring 5 will expand to its original shape and thus hold the upper end portion of the package near the upper end of the cylinder $a$ where it is accessible for removal of the empty envelope. Thus the spring 5 is provided to assist in, and facilitate, the removal of the empty envelope after its contents has been exhausted.

In Fig. 4 the tubular envelope $2^a$ is made at its upper end with an end closure wall 7 while its lower end may be constructed as described in connection with Fig. 2. In this form of my invention the outer wrapper 6 and spring are omitted.

In Fig. 5 the tubular envelope $2^b$ is constructed the same as in Fig. 4 except it is molded with annular corrugations which assist the material of said envelope in folding in an orderly fashion at the inner end of cylinder $a$ as it is compressed and collapsed by the piston $a^6$.

In Fig. 6 the tubular envelope $2^c$ is closed at its opposite ends, thereby to hold the grease 3 or the like confined therein, by forming the opposite end portions of said tubular envelope into twists 8 and 9. In this form of my invention a disc 4 is provided at each end of the body 3 of grease or the like and when preparing the package or cartridge for insertion within the cylinder $a$, its lower end portion is cut away on the plane indicated by the line $x$—$x$.

When the contents of the cartridge is exhausted the empty collapsed envelope $2^d$ may readily be removed from the gun by means of a wire or stick and a fresh cartridge substituted.

From the above description it will be clear that my invention obviates the objectionable features characterizing the use of grease guns and the like as heretofore constructed and it will be clear, also, that with moderate care the smearing of grease upon the outside of the gun or upon the hands of the user may be wholly avoided.

What I claim is:

1. As a new article of manufacture, a cartridge for grease guns and the like comprising a cylindrical body of paste-like material; a tubular collapsible wrapper of thin flexible sheet material completely inclosing said body of material and having opposite end portions extending beyond the ends of said body and closed inwardly to confine said body therein, an imperforate cutting disc of thin stiff sheet material between one end of said body of grease and the adjacent inwardly closed end portion of said wrapper adapted to co-operate with a cutting tool applied circumferentially to the exterior of said wrapper adjacent said disc.

2. As a new article of manufacture a cartridge for grease guns and the like comprising a cylindrical body of paste-like material; a tubular collapsible wrapper of thin flexible sheet material completely inclosing said body and having opposite end portions extending beyond the ends of said body and closed inwardly to confine said body therein, and a coiled spring extending concentrically throughout approximately the entire length of said wrapper and telescopically associated therewith, said spring having one end thereof connected with the rear end portion of said wrapper so that when the grease gun or the like is opened to remove the empty wrapper the latter is extended longitudinally by the spring thereby to render the same accessible.

Signed by me at Boston, Suffolk County, Massachusetts, this 10th day of March, 1930.

EDWARD R. WHARTON.